3,184,648
ELECTRICAL ASSEMBLIES
Donald R. Brown, Downers Grove, and Robert K. Campbell, Chicago, Ill., Edwin E. Leidich, Allentown, Pa., and Arthur M. Wagner, Du Page, Ill., assignors to Western Electric Company, Incorporated, New York, N.Y., a corporation of New York
Filed June 22, 1961, Ser. No. 118,935
5 Claims. (Cl. 317—101)

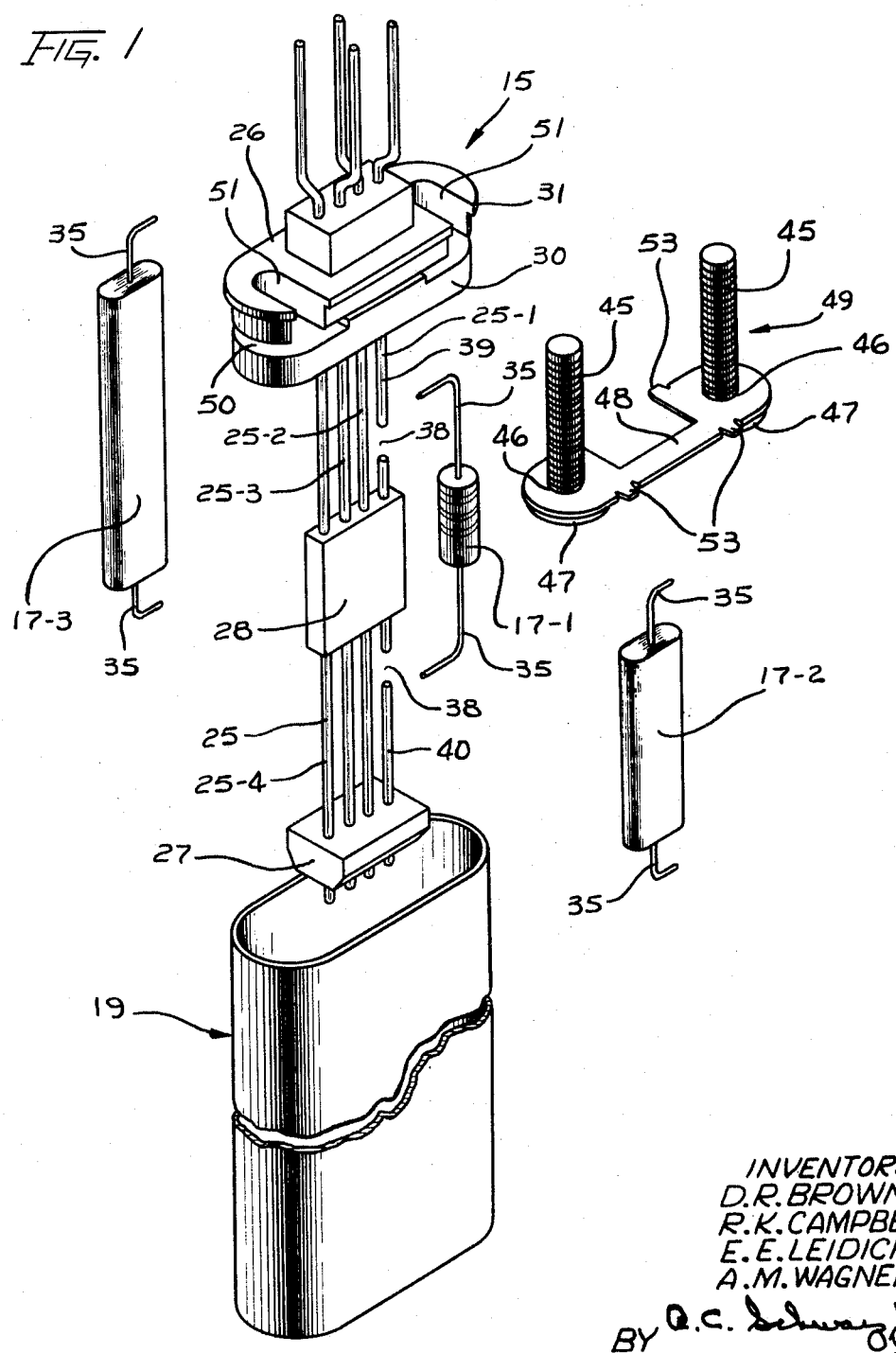

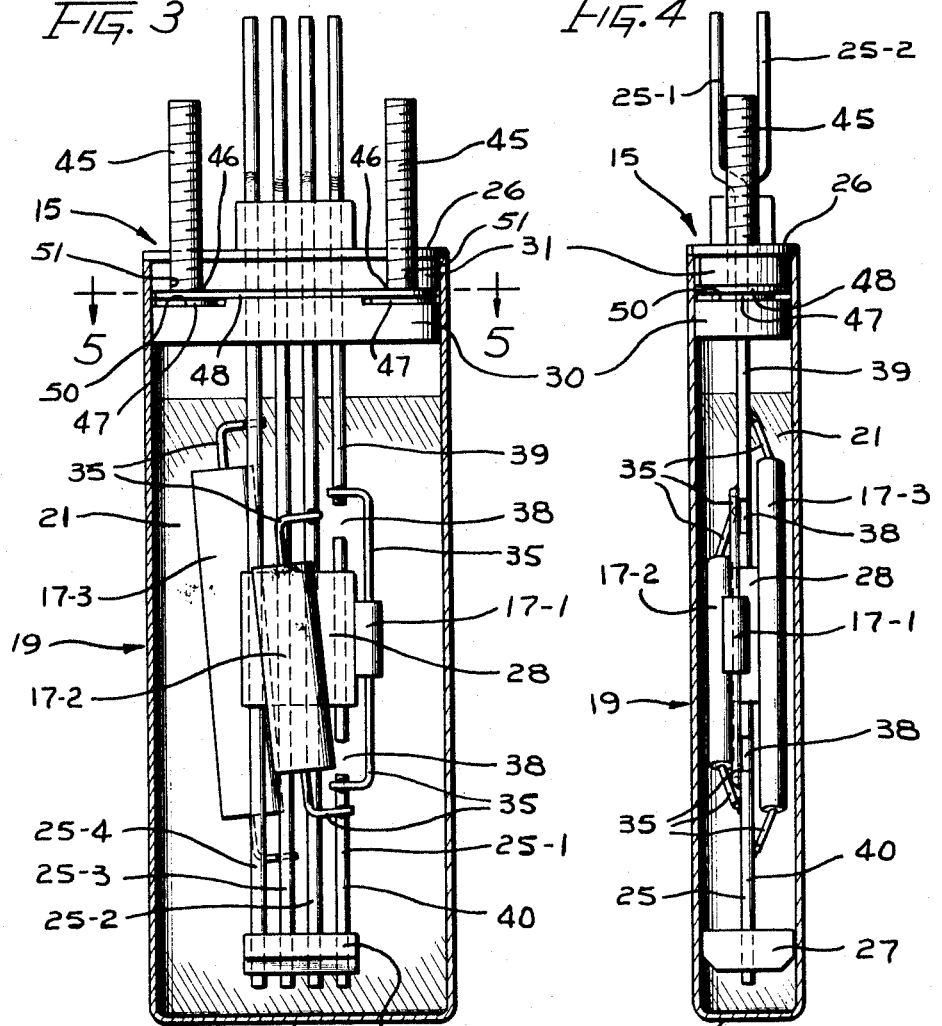

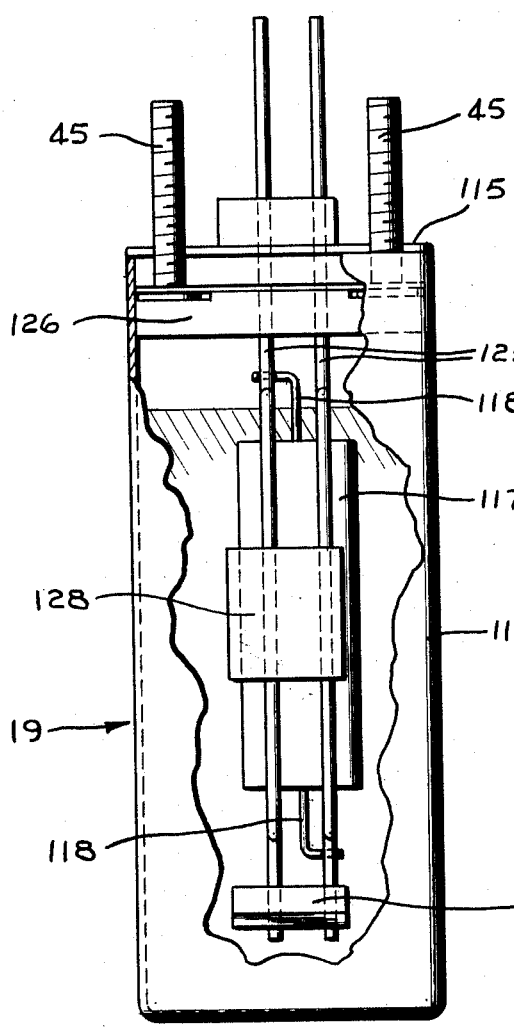
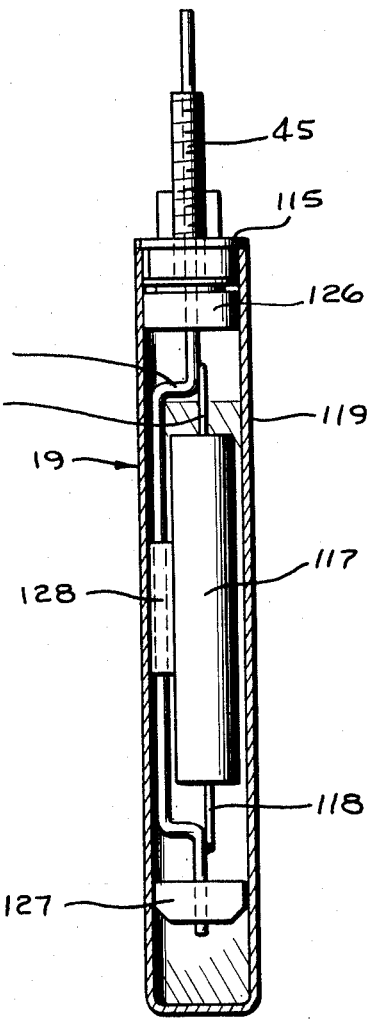

This invention relates to electrical assemblies, and more particularly to structures for readily mounting electrical components in enclosed and hermetically sealed condition.

An object of the present invention is to provide an improved electrical assembly.

Another object of the invention is to provide structures for readily mounting electrical components in enclosed and hermetically sealed condition.

With these and other objects in view, the invention contemplates the provision of a plurality of rigid wires secured in parallel and spaced relation to each other by a closure member of dielectric material molded thereto adjacent one end thereof and a spacer member of dielectric material molded thereto at the other end thereof to form a rigid mounting structure for the attachment of electrical components thereto. One or more electrical components of various types are supported on the mounting frame by bonding the leads of the components to selected ones of the wires between the closure and spacer members. The supporting structure with the electrical components thereon is inserted into an open ended flat tubular metal container with the closure member seating in and closing the open end of the container and cooperating with the spacer member to locate the mounting structure and the components thereon in predetermined positions within the container in spaced relation to one another and the container. The upper ends of the wires extend beyond the closure member and serve as terminals for establishing electrical connections with the components.

A pair of parallel laterally spaced threaded mounting studs fixed to the ends of a flat link is removably positioned with the link in laterally directed grooves in the closure member and is locked thereto by the container after the closure member is seated in the container, in which position the mounting studs are grounded to the container and serve as means for attaching the assembly to a suitable support.

Other objects, advantages and novel aspects of the invention will become apparent upon consideration of the following detailed description, in conjunction with the accompanying drawings, in which:

FIG. 1 is a perspective view of the elements of the electrical assembly in separated relation to one another;

FIG. 2 is an enlarged plan view of the electrical assembly;

FIGS. 3 and 4 are front and side views of the electrical assembly with the casing thereof shown in section;

FIG. 5 is a plan sectional view through the electrical assembly taken on the line 5—5 of FIG. 3; and FIGS. 6 and 7 are front and side views of a modified embodiment of the electrical assembly with the casing thereof shown in section.

Referring to the drawings, the electrical assembly includes a rigid component-mounting structure or frame 15 for supporting electrical components 17 thereon and establishing electrical connections therewith and a tubular container 19 which encloses the components 17 and a portion of the component-mounting structure 15 and which contains a supply of sealing compound 21 for hermetically sealing the components.

As shown in FIG. 1, the component-mounting structure 15 comprises a plurality of elongated rigid conductors in the form of relatively heavy wires 25 which are secured in closely spaced and parallel relation to one another by a closure member 26, an end spacer member 27 and an intermediate spacer member 28 of dielectric material molded to the wires 25 in spaced relation to one another. The closure member 26 has a body portion 30 which has a cross section conforming to that of the interior of the container for fitting into and closing the open end of the container. A flange 31 on the closure member 26 seats against the upper edge of the container and supports the structure 15 on the container 19 with the end spacer member 27 located adjacent the lower closed end wall 33 of the container.

Portions of the spacer member 27 extend laterally from the wires 25 into engagement with or in close proximity to the side walls of the container 19 to support the lower end of the supporting structure 15 against lateral displacement relative to the side walls of the container. The intermediate spacer block 28 is relatively thin in cross section and has opposite flat surfaces against which certain components 17 may be placed and positioned thereby in laterally spaced relation to each other, the wires 25, and the walls of the container 19.

The components 17 may be variously arranged and supported on the mounting structure 15 with the leads 35 of the components 17 bonded to selected conductors 25. In the embodiment shown in FIGS. 1 to 4, the wire 25–1 of the wires 25 has sections 38 thereof cut away to form stub terminals 39 and 40 adjacent the closure member 26 and the spacer block 27 respectively. A first electrical component 17–1 is mounted on the supporting structure 15 in laterally spaced relation to the wires 25 in the plane of the wires and has its leads 35 welded or otherwise bonded to the stub terminals 39 and 40.

A second electrical component 17–2 is electrically connected in series with the component 17, the component 17–2 being positioned against one side of the intermediate spacer member 28 and the leads 35 of the component being bonded to the stub terminal 40 and to the wire 25–2. Electrical connections to the component 17–1 and 17–2 is established through the terminal portions of the wires 21–1 and 21–2 extending upwardly beyond the closure member 26. A third electrical component 17–3 is attached to the mounting structure 15 on the other side of the intermediate spacer block 28 and the leads 35 of the component are bonded to the wires 25–3 and 25–4 as shown in FIG. 3 and exterior electrical connections are established therewith through the upper terminal portions of the wires 25–3 and 25–4.

A pair of threaded studs 45 are removably secured to and extend from the closure member 26 for securing the electrical assembly to a support on the equipment to which it is to be attached. The studs 45 have shanks that fit in apertures 46 in opposite ends of a flat U-shaped metal link 47 and have heads 48 that are welded to the link to form an attaching stud unit 49. The closure member 26 is provided with a horizontally disposed slot 50 conforming generally to the outline of the U-shaped link 47 and extending laterally into the closure member from one side thereof and at a level intermediate the upper and lower surfaces thereof for receiving the link 47. Extending upwardly from the slot 50 in the closure member 26 are slots 51 for receiving the studs 45 and providing clearance therefor during movement of the studs into assembled relation with the closure member.

The attaching stud unit 49 is slidable into assembled relation with the closure member 26, and when the supporting structure 15 with the components 17 thereon is mounted in assembled relation with the container 19, the stud unit 49 is held against removal from the closure member 26 by the walls of the container 19. Laterally extending projections 53 on the link 47 engage the side walls of the container 19 to establish an electrical connection between the casing and the studs 45 for effecting the grounding of the container to the equipment to which it is mounted.

In the embodiment of the invention shown in FIGS. 6 and 7, the electrical assembly is provided with a component-mounting structure 115 employing only a pair of wires 125 for supporting a single electrical component 117 thereon. The structure 115 includes a closure member 126, an end spacing block 127 and an intermediate spacing block 128 of dielectric material molded thereto as indicated in FIGS. 6 and 7. In this embodiment, the wires 125 have an intermediate portion thereof bent laterally as indicated in FIG. 7 to provide more room between the wires and one wall of the container 119 for the reception of a relatively large electrical component 117, the leads 118 on opposite ends of which are bonded to the pair of wires 125 as indicated in FIG. 6.

After the electrical components 17 have been connected to the component-mounting structure 15 and the attaching stud unit 49 has been assembled on the closure member 26, a predetermined amount of the sealing compound 21 is inserted in the container 19 after which the electrical assembly is inserted in the container, the quantity of sealing compound being sufficient to enclose and hermetically seal the electrical components 17.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. An electrical assembly comprising a tubular metallic container having a closed end and an open end, a plurality of rigid wires, a first block of dielectric material secured to said wires adjacent to one end thereof and slidable into the open end of said container for closing it, a second block of dielectric material slidable into said container and secured to the wires in spaced relation to said first block and cooperating with said first block for supporting the wires in predetermined laterally spaced relation to each other and to said container, said wires and said dielectric blocks forming a mounting structure for supporting electrical components thereon for movement therewith into said container, electrical components having leads bonded to selected wires between said dielectric blocks and supported thereby in predetermined positions on said mounting structure and in said container, one of said dielectric blocks having portions engageable with an end portion of said container for supporting said mounting structure in a predetermined position longitudinally of said container, the end portions of the wires projecting from said first dielectric block and said container to form terminal posts electrically connected with the components, and an attaching stud unit including a pair of threaded studs and a member bonded to one end of each of said studs for supporting said studs in laterally spaced and parallel relation to each other, said first dielectric block having a first slot therein disposed transversely of said wires for receiving said member and having second slots extending transversely from said first slot for receiving said studs, said attaching stud unit being removably supported in assembled relation with said first block of said mounting structure when said mounting structure is without said container and being locked in assembled relation to said first block by said container when said mounting structure is within said container.

2. A structure for the attachment of electrical components thereto and for supporting the components within a ubular container having an open end which comprises a plurality of relatively rigid wires, a first block of dielectric material fixedly mounted on the wires adjacent one of the ends thereof, a second block of dielectric material fixedly mounted on the wires in spaced relation to said first block, said wires being supported by said blocks in laterally spaced relation to one another and with the portions of the wires disposed between said blocks being accessible for the selective bonding thereto of leads of electrical components and for supporting said components, said first block having a body portion conforming to and fitting into the open end of said container to close it and having a flange thereon engageable with the edge of the open end of the container for supporting said second block and a portion of said wires and the electrical components attached thereto within said container, said second dielectric block having portions thereof extending laterally from the wires and engageable with opposing portions of the walls of said container for holding the wires against lateral displacement in the container, said wires having end portions extending from said first block and serving as terminal posts for the establishment of electrical connections with the components mounted on said wires.

3. An electrical assembly comprising a tubular metallic container having an open end and a closed end, a plurality of rigid laterally spaced wires, a first block of dielectric material molded to said wires adjacent one end thereof and insertable in the open end of said container for closing said container, a second block of dielectric material molded to the wires at the opposite end thereof and having portions thereof in close proximity to opposite walls of the container, a flat third block of dielectric material molded to the wires intermediate said first and said second blocks and in spaced relation thereto, electrical components disposed on opposite sides of said third block and having leads bonded to selected ones of said wires between said third and said second dielectric blocks and between said third and first dielectric blocks, an attaching stud unit including a pair of threaded studs and a connecting member bonded to one end of the studs for supporting said studs in spaced and parallel relation to each other, said first dielectric block having recesses extending therein from one side for receiving said mounting stud unit in a predetermined position with the mounting studs extending from said first dielectric block on opposite sides of said wires and in spaced and substantially parallel relation thereto, the arrangement being such that when said attaching stud unit is assembled to said first dielectric block and inserted therewith into the open end portion of said container, said attaching stud unit is engaged by the walls of said container and held thereby in assembled relation to said first dielectric block.

4. An electrical assembly comprising a tubular metallic container having an open end and a closed end for holding a supply of dielectric sealing material, a first block of dielectric material insertable in the open end of said container for closing the container and having a flange engageable with the end of the container for supporting said block in a predetermined position longitudinally of the container, a plurality of wires embedded in and extending through said first block with portions of the wires disposed within said container and other portions thereof disposed without said container, an electrical component having leads bonded to said first portions of selected wires and supported thereby with the component immersed in said sealing material, and an attaching stud unit including a pair of threaded studs and a member bonded to one end thereof for supporting said studs in spaced and parallel relation to each other, said dielectric block having a first slot disposed transversely of the wires for receiving said member and having second slots extending transversely from said first slot for receiving the studs in a predetermined position therein on opposite sides of and in spaced relation to said wires, the arrangement being such that said attaching stud unit may be placed into assembled relation to said first dielectric block when said block is without said container and said attaching stud unit is in contact with and is held by said container in assembled relation to said first block when said block is inserted in said container.

5. An electrical assembly comprising a metallic container having an open end, a block of dielectric material insertable into the open end of said container to close the container and be supported thereby, a plurality of wires embedded in and extending through said block with first portions of the wires disposed within said container and with second portions of the wires disposed without said container, a member having an enlarged portion secured to said block for attaching said block to a support, said block having a laterally disposed recess for receiving the enlarged portion of said member in a predetermined position therein in insulated relation to said wires and with the enlarged portion engaging said container and held thereby against movement relative to said block when said block is in said container, and an electrical component having leads bonded to said first portions of selected ones of said wires and supported thereby within said container.

References Cited by the Examiner
UNITED STATES PATENTS

| | | | |
|---|---|---|---|
| 2,637,763 | 3/53 | Palmer | 317—101 |
| 2,737,579 | 3/56 | Wehrlin et al. | 317—101 |
| 2,774,014 | 12/56 | Henry | 317—101 |

JOHN F. BURNS, *Primary Examiner.*